(12) United States Patent
Katsumata et al.

(10) Patent No.: US 12,323,626 B2
(45) Date of Patent: Jun. 3, 2025

(54) INFORMATION PROCESSING DEVICE AND INFORMATION PROCESSING METHOD

(71) Applicant: Sony Group Corporation, Tokyo (JP)

(72) Inventors: Mitsuru Katsumata, Tokyo (JP); Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 279 days.

(21) Appl. No.: 17/911,677

(22) PCT Filed: Mar. 19, 2021

(86) PCT No.: PCT/JP2021/011360
§ 371 (c)(1),
(2) Date: Sep. 15, 2022

(87) PCT Pub. No.: WO2021/193428
PCT Pub. Date: Sep. 30, 2021

(65) Prior Publication Data
US 2023/0179801 A1 Jun. 8, 2023

Related U.S. Application Data

(60) Provisional application No. 63/026,901, filed on May 19, 2020, provisional application No. 63/000,565, filed on Mar. 27, 2020.

(51) Int. Cl.
*H04N 19/82* (2014.01)
*H04N 19/105* (2014.01)
(Continued)

(52) U.S. Cl.
CPC ........... *H04N 19/70* (2014.11); *H04N 19/167* (2014.11); *H04N 19/172* (2014.11); *H04N 19/96* (2014.11)

(58) Field of Classification Search
CPC .... H04N 19/70; H04N 19/167; H04N 19/172; H04N 19/96; H04N 19/119; H04N 19/157; H04N 19/184
See application file for complete search history.

(56) References Cited

U.S. PATENT DOCUMENTS

10,271,076 B2 * 4/2019 Hirabayashi ..... H04N 21/85406
10,419,801 B2 * 9/2019 Hirabayashi ........... H04N 19/44
(Continued)

FOREIGN PATENT DOCUMENTS

| GB | 2587243 | * 9/2019 | ............. H04N 19/96 |
| GB | 2585111 | * 12/2019 | ............. H04N 19/91 |

(Continued)

OTHER PUBLICATIONS

H.264 Standard (Year: 2014).*
(Continued)

*Primary Examiner* — Philip P. Dang
(74) *Attorney, Agent, or Firm* — XSENSUS LLP

(57) ABSTRACT

A decrease in bit efficiency is suppressed. An information processing device includes an encoding unit (101) that encodes a picture including two or more subpictures to generate encoded data; a metadata generation unit (102) that generates subpicture mapping information including first size information of a first subpicture among the two or more subpictures and information that second size information of each of one or more second subpictures other than the first subpicture being considered the same as the first size information of the first subpicture; and a bitstream generation unit (103) that generates a bitstream including the encoded data and the subpicture mapping information.

14 Claims, 10 Drawing Sheets

(51) Int. Cl.
*H04N 19/167* (2014.01)
*H04N 19/172* (2014.01)
*H04N 19/176* (2014.01)
*H04N 19/70* (2014.01)
*H04N 19/96* (2014.01)

(56) References Cited

U.S. PATENT DOCUMENTS

| | | | | |
|---|---|---|---|---|
| 10,951,871 | B2* | 3/2021 | Takahashi | H04N 13/161 |
| 11,375,232 | B2* | 6/2022 | Wu | H04N 19/90 |
| 11,671,625 | B2* | 6/2023 | Hannuksela | H04N 21/23439 |
| | | | | 375/240.12 |
| 2017/0201757 | A1* | 7/2017 | Goldman | H04N 19/177 |
| 2019/0082178 | A1* | 3/2019 | Kim | H04N 19/136 |
| 2022/0182681 | A1* | 6/2022 | Paluri | H04N 19/176 |

FOREIGN PATENT DOCUMENTS

| | | | | |
|---|---|---|---|---|
| GB | 2590632 | * | 12/2019 | H04N 19/119 |
| WO | 2018/221368 A1 | | 12/2018 | |
| WO | WO2020/141248 | * | 7/2020 | H04N 19/119 |
| WO | WO2020/141260 | * | 7/2020 | H04N 19/105 |
| WO | WO2020/185892 | * | 9/2020 | H04N 19/96 |

OTHER PUBLICATIONS

H.265 Standard (Year: 2016).*
H.266 Standard Draft—Version 8 (Year: 2020).*
International Search Report and Written Opinion mailed on Jun. 1, 2021, received for PCT Application PCT/JP2021/011360, filed on Mar. 19, 2021, 12 pages including English Translation.
Bross et al., "Versatile Video Coding (Draft 6)", Joint Video Experts Team (JVET) of ITU-T SG 16 WP3 and ISO/IEC JTC1/SC29/WG11, JVET-O2001-vE, Jul. 3-12, 2019, 17 pages.
Bross et al., "Versatile Video Coding (Draft 8)", Joint Video Experts Team (JVET) of ITU-T SG 16 WP 3 and ISO/IEC JTC 1/SC 29/WG 11, JVET-Q2001-vE, Jan. 7-17, 2020, 21 pages.
Katsumata et al., "AHG12: Cleanup of subpicture layout signalling", Joint Video Experts Team (JVET) of ITU-T SG 16 WP 3 and ISO/IEC JTC 1/SC 29/ WG 11, JVET-S0071-v5, Jun. 22-Jul. 1, 2020, pp. 1-9.
Sjoberg et al., "AHG12: On Uniform Tile Partitioning", Joint Video Experts Team (JVET) of ITU-T SG 16 WP 3 and ISO/IEC JTC1/SC29/WG11, JVET-N0498, Mar. 19-27, 2019, pp. 1-7.
Wang et al., "Tile groups", Joint Collaborative Team on Video Coding (JCT-VC) of ITU-T SG16 WP3 and ISO/IEC JTC1/SC29/WG11, JCTVC-H0520rl, Feb. 1-10, 2012, pp. 1-8.
Zhou, "AHG4: Sub-stream entry points SEI message", Joint Collaborative Team on Video Coding (JCT-VC) of ITU-T SG16 WP3 and ISO/IEC JTC1/SC 29/WG11, JCTVC-K0200, Oct. 10-19, 2012, pp. 1-8.
Bross Bet al: "Versatile Video Coding (Draft 5) ", 14. JVET Meeting; Mar. 19, 2019-Mar. 27, 2019; Geneva; (The Joint Video Exploration Team of ISO/IEC JTC1/SC29/WG11 and ITU-T SG.16) No. JVET-N1001 Jul. 2, 2019 (Jul. 2, 2019), pp. 1-406, XP030220731.

* cited by examiner

FIG.2

| | | Descriptor |
|---|---|---|
| 1. | seq_parameter_set_rbsp( ) { | |
| | ... | |
| 2. | subpic_info_present_flag | u(1) |
| 3. | if( subpic_info_present_flag ){ | |
| 4. | sps_num_subpics_minus1 | ue(V) |
| 5. | sps_independent_subpics_flag | u(1) |
| 6. | for( i = 0; sps_num_subpics_minus1 > 0 && i <= sps_num_subpics_minus1; i++ ) { | |
| 7. | if( i > 0 && pic_width_max_in_luma_samples > CtbSizeY ) | |
| | subpic_ctu_top_left_x[ i ] | u(v) |
| 8. | if( i > 0 && pic_height_max_in_luma_samples > CtbSizeY ) { | |
| 9. | subpic_ctu_top_left_y[ i ] | u(v) |
| 10. | if( i < sps_num_subpics_minus1 && | |
| | pic_width_max_in_luma_samples > CtbSizeY ) | |
| 11. | subpic_width_minus1[ i ] | u(v) |
| 12. | if( i < sps_num_subpics_minus1 && | |
| | pic_height_max_in_luma_samples > CtbSizeY ) | |
| 13. | subpic_height_minus1[ i ] | u(v) |
| 14. | if( !sps_independent_subpics_flag) { | |
| 15. | subpic_treated_as_pic_flag[ i ] | u(1) |
| 16. | loop_filter_across_subpic_enabled_flag[ i ] | u(1) |
| 17. | } | |
| 18. | } | |
| | ... | |

FIG.5

|  | bit LENGTH |
|---|---|
| subpic_ctu_top_left_x | 5 |
| subpic_ctu_top_left_y | 4 |
| subpic_width_minus1 | 5 |
| subpic_height_minus1 | 4 |

FIG.6

| | Descriptor |
|---|---|
| seq_parameter_set_rbsp( ) { | |
| 1.    subpic_info_present_flag | u(1) |
| 2.    if( subpic_info_present_flag ) { | |
| 3.      sps_num_subpics_minus1 | ue(v) |
| 4.      sps_independent_subpics_flag | u(1) |
| 5.      fixed_subpic_width_height_flag | u(1) |
| 6.      for( i = 0; sps_num_subpics_minus1 > 0 && i <= sps_num_subpics_minus1; i++ ) { | |
| 7.        if( i > 0 && pic_width_max_in_luma_samples > CtbSizeY ) | |
| 8.          subpic_ctu_top_left_x[ i ] | u(v) |
| 9.        if( i > 0 && pic_height_max_in_luma_samples > CtbSizeY ) | |
| 10.          subpic_ctu_top_left_y[ i ] | u(v) |
| 11.        if( i < sps_num_subpics_minus1 && <br>            pic_width_max_in_luma_samples > CtbSizeY && ( !fixed_subpic_width_height_flag <br>            || (fixed_subpic_width_height_flag && ( i==0 ))) | |
| 12.          subpic_width_minus1[ i ] | u(v) |
| 13.        if( i < sps_num_subpics_minus1 && <br>            pic_height_max_in_luma_samples > CtbSizeY && ( !fixed_subpic_width_height_flag <br>            || (fixed_subpic_width_height_flag && ( i==0 ))) | |
| 14.          subpic_height_minus1[ i ] | u(v) |
| 15.        if( !sps_independent_subpics_flag) { | |
| 16.          subpic_treated_as_pic_flag[ i ] | u(1) |
| 17.          loop_filter_across_subpic_enabled_flag[ i ] | u(1) |
| 18.        } | |
| 19.      } | |
|     ... | |

FIG.7

| | |
|---|---|
| 7. if( i > 0 && pic_width_max_in_luma_samples > CtbSizeY && <br> !fixed_subpic_width_height_flag ) | |
| 8.   subpic_ctu_top_left_x[ i ] | u(v) |
| 9. if( i > 0 && pic_height_max_in_luma_samples > CtbSizeY && <br> !fixed_subpic_width_height_flag ) | |
| 10.   subpic_ctu_top_left_y[ i ] | u(v) |

INFORMATION PROCESSING DEVICE AND INFORMATION PROCESSING METHOD

CROSS-REFERENCE TO RELATED APPLICATIONS

The present application is based on PCT filing PCT/JP2021/011360, filed Mar. 19, 2021, which claims priority to U.S. Provisional Application No. 63/000,565, filed Mar. 27, 2020 and U.S. Provisional Application No. 63/026,901, filed May 19, 2020, the entire contents of each are incorporated herein by reference.

FIELD

The present disclosure relates to an information processing device and an information processing method.

BACKGROUND

In versatile video coding (VVC), which is being established as a standard specification of an image encoding technique, each image (picture) is divided into one or more slices (see, for example, Non Patent Literature 1). Furthermore, in the VVC, each picture can be segmented into one or more subpictures.

In the VVC, the subpicture is rectangular, and is divided into one or more slices. This subpicture function is assumed to be used, for example, in partially decoding a full spherical video or the like, merging for combining a plurality of pictures into one picture, or the like.

Subpicture mapping information such as a position and a size of each subpicture in the picture is stored in a sequence parameter set (SPS) as parameters in coding tree unit (CTU), which is a minimum unit of encoding.

CITATION LIST

Non Patent Literature

Non Patent Literature 1: Benjamin Bross, Jianle Chen, Shan Liu, Ye-Kui Wang, "Versatile Video Coding (Draft 8)", JVET-Q2001-vE, Joint Video Experts Team (JVET) of ITU-T SG 16 WP 3 and ISO/IEC JTC 1/SC 29/WG 11 17th Meeting: Brussels, BE, 7-17 Jan. 2020

SUMMARY

Technical Problem

However, in the method described in Non Patent Literature 1, since the unit of the subpicture mapping information is CTU based on resolution, redundant bits may be generated, resulting in a problem that bit efficiency may decrease.

Therefore, the present disclosure has been made in light of such a situation, and proposes an information processing device and an information processing method capable of suppressing a decrease in bit efficiency.

Solution to Problem

An information processing device being one aspect of the present technique comprises: an encoding unit that encodes a picture including two or more subpictures to generate encoded data; a metadata generation unit that generates subpicture mapping information including first size information of a first subpicture among the two or more subpictures and information that second size information of each of one or more second subpictures other than the first subpicture being considered the same as the first size information of the first subpicture; and a bitstream generation unit that generates a bitstream including the encoded data and the subpicture mapping information.

An information processing device being another aspect of the present technique comprises: an extraction unit that acquires encoded data and subpicture mapping information from a bitstream; a decoding unit that decodes the encoded data to restore a picture, and segments the restored picture into two or more subpictures on the basis of the subpicture mapping information; and a rendering unit that renders the picture according to the two or more subpictures, wherein the subpicture mapping information including first size information of a first subpicture among the two or more subpictures and information that second size information of each of one or more second subpictures other than the first subpicture being considered the same as the first size information of the first subpicture.

BRIEF DESCRIPTION OF DRAWINGS

FIG. 2 is a diagram illustrating an example of a sequence parameter set in which subpicture mapping information is signaled.

FIG. 5 is a diagram illustrating an example of a bit length of each parameter in semantics of subpicture mapping information.

FIG. 6 is a diagram illustrating an example of a sequence parameter set in which subpicture mapping information is signaled according to one embodiment of the present disclosure.

FIG. 7 is a diagram illustrating an example of a part of a sequence parameter set in which subpicture mapping information is signaled according to a modification of one embodiment of the present disclosure.

DESCRIPTION OF EMBODIMENTS

Figure 1:
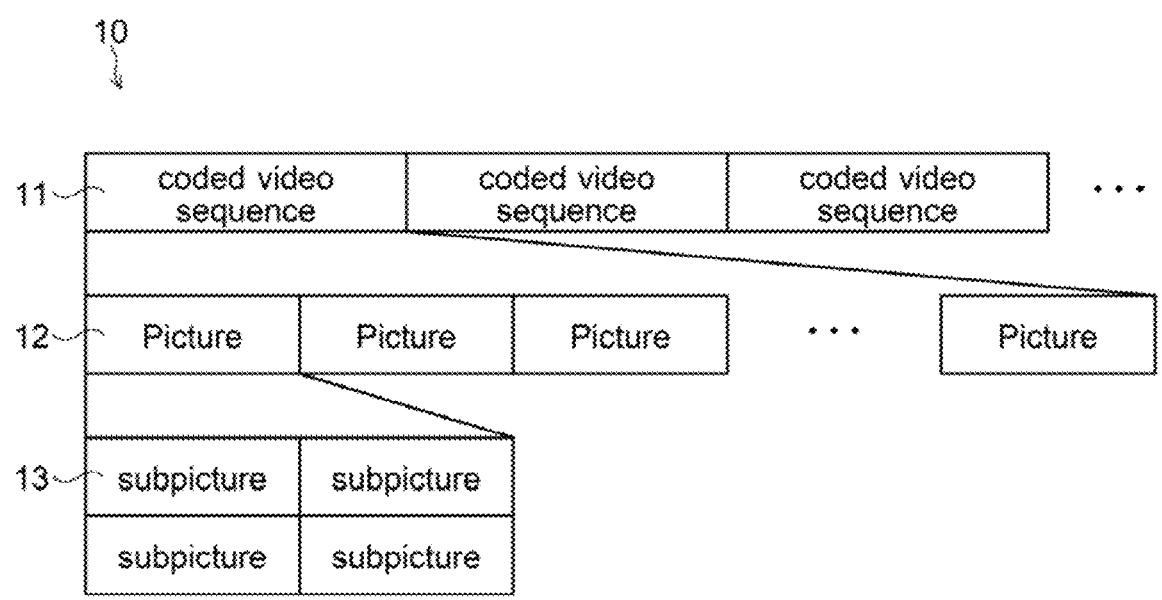
FIG. 1 is a diagram illustrating a configuration example of a bitstream.

Hereinafter, modes for carrying out the present disclosure will be described. Note that the description will be given in the following order.
1. Introduction
2. One Embodiment
2.1 Syntax of Subpicture Mapping Information
2.2 Improvement in Bit Efficiency According to Omission of Parameter Indicating Reference Position of Each Subpicture (Modification)
2.3 Configuration Example of Image Encoding Device
2.3.1 Flow of Encoding Processing
2.4 Configuration Example of. Image Decoding Device
2.4.1 Flow of Decoding Processing
3. Appendix

1. Introduction

The scope of the present technology disclosed herein includes not only the contents described in the embodiments but also the contents described in the following non-patent literature that had been disclosed at the time of filing the present application, the contents of other literatures referred to in the following non-patent literature, and the like.

Non Patent Literature 1: (as described above)

That is, the contents described in the aforementioned non-patent literature also serve as a basis for determining whether to meet the support requirements. For example, concerning a sequence parameter set described in Non Patent Literature 1, although its syntax and decoding processing are not directly defined in the description of the present disclosure, the syntax and decoding processing fall within the scope of the present disclosure and satisfy the support requirements of the claims. Furthermore, for example, although technical terms such as parsing, syntax, and semantics are not directly defined in the description of the present disclosure, such terms also fall within the scope of the present disclosure and satisfy the support requirements of the claims.

Furthermore, in the present specification, the term "block" (that is not a block indicating a processing unit) used to describe a partial region of an image (picture) or a unit of processing refers to an arbitrary partial region in the picture unless otherwise specified, and a size, a shape, a characteristic, and the like thereof are not limited. For example, the "block" includes an arbitrary partial region (a unit of processing) such as a transform block (TB), a transform unit (TU), a prediction block (PB), a prediction unit (PU), a smallest coding unit (SCU), an encoding unit (CU), a largest coding unit (LCU), a coding tree block (CTB), a coding tree unit (CTU), a subblock, a macroblock, a tile, or a slice, which is described in the aforementioned non-patent literature.

In addition, at the time of designating a size of such a block, the block size may be designated in an indirect manner as well as in a direct manner. For example, the block size may be designated using identification information for identifying a size. Alternatively, for example, the block size may be designated based on a ratio or a difference with respect to a size of a reference block (e.g., LCU or SCU). For example, in a case where information for designating a block size is transmitted as a syntax element or the like, information for indirectly designating a size as described above may be used as the information. By doing so, an amount of the information can be reduced, thereby improving coding efficiency. In addition, the designation of the block size includes designating a block size range (e.g., designating an allowable block size range).

Subpicture

In the VVC described in Non Patent Literature 1, a function called subpicture is implemented, such that an image region corresponding to a picture is segmented into a plurality of partial regions when used.

FIG. 1 is a diagram illustrating a main configuration example of a VVC bitstream that is a bitstream generated by encoding an image using a VVC technique. A VVC bitstream 10 illustrated in FIG. 1 is encoded data of a moving image including a plurality of frame images. The VVC bitstream 10 is configured by a set of encoded data 11 of coded video sequences (CVSs). One CVS is a set of pictures within a certain period. The certain period does not need to be a fixed period, and may vary for each piece of the encoded data 11. The picture is a frame image at a certain time. That is, the encoded data 11 of the CVS is configured by a set of encoded data 12 of pictures at respective times within the certain period.

The encoded data 12 of the picture is configured by a set of encoded data 13 of subpictures. The subpictures are partial regions into which a picture (that is, an image region corresponding to a picture) is segmented.

In the VVC described in Non Patent Literature 1, the picture and the subpicture have the following features. The picture and the subpicture are rectangular. There is no pixel having no encoded data in the picture. There is no overlap between the subpictures. There is no pixel that is not included in any subpicture as a pixel of the picture.

The subpicture is a function intended to implement decoding (distributed processing) for each subpicture or reduce an instance of a decoder by merging a plurality of pictures or subpictures into one picture.

For example, by allocating six-side images of each cube of a full spherical video (3 degree of freedom (DoF) content) projected using a cube map technique to respective subpictures, various types of controls are facilitated, such as processing of the images on the respective sides in an independent manner or in a merged manner. Note that, since the subpicture is not a unit of coding such as a slice or a tile, for example, another subpicture can also be referred to at the time of encoding.

In order to implement such subpicture, picture segmentation information (subpicture mapping information) is signaled (that is, transmitted from an encoding device to a decoding device).

The subpicture mapping information is information (unchangeable information) fixed in the CVS. For example, the subpicture mapping information is signaled in a sequence parameter set (SPS), which is a set of parameters as units of sequence, as in syntax illustrated in FIG. 2.

In semantics illustrated in FIG. 2, a value obtained by adding 1 to "sps_num_subpics_minus1" indicates the number of subpictures included in each picture of a coded layer video sequence (CLVS). The value of "sps_num_subpics_minus1" may be included in a range from zero to a value obtained by using a sealing function "Ceil(pic_width_max_in_luma_samples+CtbSizeY)<Ceil(pic_ height_max_in_luma_samples+CtbSizeY)−1". If "sps_num_subpics_minus1" is not included in the semantics, its value is estimated to be zero.

"subpic_ctu_top_left_x[i]" indicates a horizontal position in units of CTU of an upper left end of an i-th subpicture in unit of CtbSizeY. A bit length of a corresponding syntax element in the semantics is a bit length obtained by "Ceil (Log 2((pic_width_max_in_luma_samples+CtbSizeY−1)>> Ctb Log 2SizeY))". If "subpic_ctu_top_left_x[i]" is not included in the semantics, its value is estimated to be zero.

"subpic_ctu_top_left_y[i]" indicates a vertical position in units of CTU of an upper left end of an i-th subpicture in unit of CtbSizeY. A bit length of a corresponding syntax element in the semantics is a bit length obtained by "Ceil(Log 2((pic_height_max_in_luma_samples+CtbSizeY−1)>>Ctb Log 2SizeY))". If "subpic_ctu_top_left_y[i]" is not included in the semantics, its value is estimated to be zero.

A value obtained by adding 1 to "subpic_width_minus1 [i]" indicates a width of an i-th subpicture in unit of CtbSizeY. A bit length of a corresponding syntax element in the semantics is a bit length obtained by "Ceil(Log 2((pic_width_max_in_luma_samples+CtbSizeY−1)>>Ctb Log 2SizeY))". If "subpic_width_minus1[i]" is not included in the semantics, its value is estimated to be equal to "((pic_width_max_in_luma_samples+CtbSizeY−1)>>Ctb Log 2SizeY)−subpic_ctu_top_left_x[i]−1".

A value obtained by adding 1 to "subpic_height_minus1 [i]" indicates a height of an i-th subpicture in unit of CtbSizeY. A bit length of a corresponding syntax element in the semantics is a bit length obtained by "Ceil(Log 2((pic_height_max_in_luma_samples+CtbSizeY−1)>>Ctb Log 2SizeY))". If "subpic_height_minus1[i]" is not included in the semantics, its value is estimated to be equal to "((pic_height_max_in_luma_samples+CtbSizeY−1)>> Ctb Log 2SizeY)−subpic_ctu_top_left_y[i]−1".

Note that, in the semantics exemplified in FIG. 2, "CtbSizeY" indicates a CTB size of the CTU (unit: sample), "Ctb Log 2SizeY" indicates a value of Log 2 of CtbSizeY, "pic_width_max_in_luma_samples" indicates a width of a picture (unit: sample), and "pic_height_max_in_luma_samples" indicates a height of a picture (unit: sample).

Figure 3:
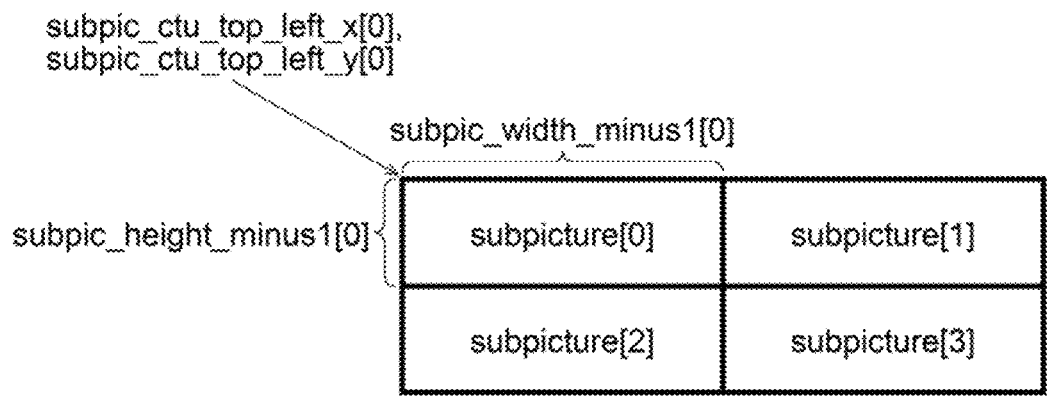
FIG. 3 is a diagram illustrating examples of position information and size information of a reference pixel in each partial region indicated by subpicture mapping information.

Such subpicture mapping information is information indicating a layout of each partial region as a subpicture. As illustrated in FIG. 3, the subpicture mapping information expresses each subpicture based on position information (e.g., X and Y coordinates, hereinafter also referred to as a reference position) and size information of a reference pixel (e.g., a pixel at an upper left end) of each partial region. In the example of FIGS. 2 and 3, a horizontal-direction position (subpic_ctu_top_left_x) and a vertical-direction position (subpic_ctu_top_left_y) of a pixel at an upper left end of each segmented region are indicated in units of CTU as the position information of the reference pixel of each subpicture. Furthermore, a width (subpic_width_minus1) and a height (subpic_height_minus1) of each segmented region are indicated in units of CTU as the size information of each subpicture.

The bit lengths of the parameters (e.g., the position information and the size information of the reference pixel) for specifying a partial region corresponding to each subpicture can be obtained by calculation from a width and a height of a picture and a size of a CTB constituting the CTU. The size of the CTB constituting the CTU (hereinafter also referred to as CTU size) is usually any one of 32 sample, 64 sample, and 128 sample.

Figure 4:
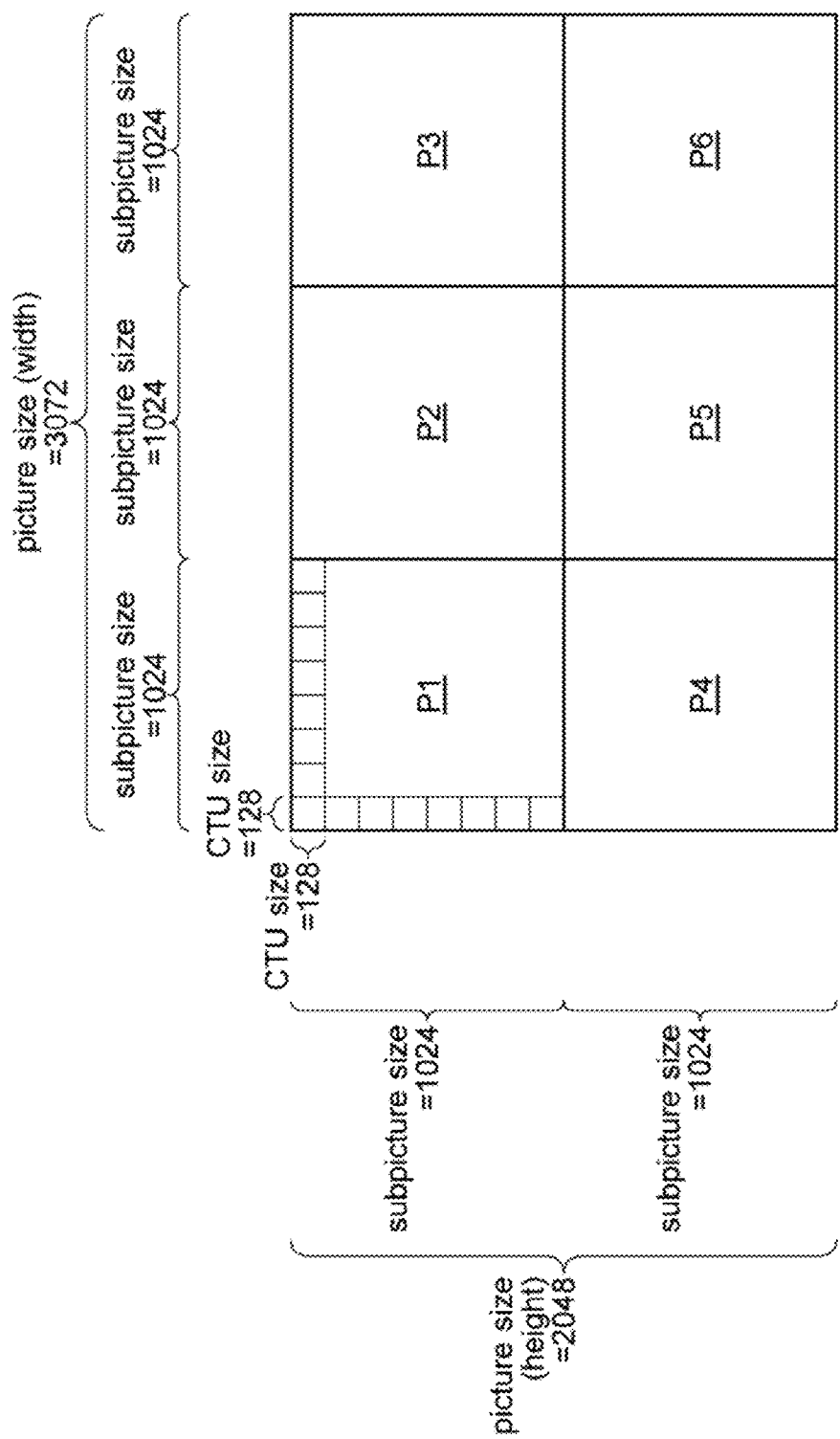
FIG. 4 is a diagram illustrating a case where a picture having a size of 3072×2048 pixels is segmented into six subpictures having an equal size.

Here, respective bit lengths in semantics of parameters "subpic_ctu_top_left_x[i]", "subpic_ctu_top_left_y[i]", "subpic_width_minus1[i]", and "subpic_height_minus1 [i]" in a case where a picture having a size of 3072×2048 pixels is segmented into six subpictures having an equal size of 1024×1024 pixels will be described. This may be, for example, a case in which it is assumed that each of six sides of a full spherical video is used for a subpicture on a cub map. FIG. 4 is a diagram illustrating a case where a picture having a size of 3072×2048 pixels is segmented into six subpictures having an equal size. FIG. 5 is a diagram illustrating a bit length of each parameter in semantics of subpicture mapping information in the case exemplified in FIG. 4. Note that in FIGS. 4 and 5, a CTU size is 128.

In the semantics as illustrated in FIG. 5, a bit length of "subpic_ctu_top_left_x[i]" is 5 bits, a bit length of "subpic_ctu_top_left_y[i]" is 4 bits, a bit length of "subpic_height_minus1[i]" is 5 bits, and a bit length of "subpic_height_minus1[i]" is 4 bits. For example, the number of bits required to express "subpic_ctu_top_left_x[i]" up to 3072 with the CTU size being 128 is 5 bits.

Therefore, as illustrated in FIG. 4, in a case where a picture having a size of 3072×2048 pixels is segmented into six subpictures having an equal size of 1024×1024 pixels, a total bit length of the parameters of each subpicture is 18 bits (=5 bits+4 bits+5 bits+4 bits). However, concerning a subpicture P1 located on an upper left side, since parameters "subpic_ctu_top_left_x[0]" and "subpic_ctu_top_left_y[0]" can be omitted, a total bit length of parameters of the subpicture P1 is 9 bits. Similarly, concerning a subpicture P6 located on a lower right side, since parameters "subpic_width_minus1[5]" and "subpic_height_minus1[5]" can be omitted, a total bit length of parameters of the subpicture P6 is 9 bits. As a result, the sum of bit lengths of parameters of one entire picture is 90 bits (=9 bits+18 bits+18 bits+18 bits+18 bits+9 bits).

As described above, in the subpicture mapping information, parameters of upper-left coordinate position and size information (width and height) for each subpicture are signaled in units of CTU. Here, since the CTU is a unit region defined on the basis of a resolution of a picture, the CTU is very smaller than a picture or a subpicture. Thus, when the parameters for each subpicture are defined in units of CTU, bit lengths required to describe the parameters may be great, thereby decreasing bit efficiency.

In this regard, in the present disclosure, a method capable of omitting a parameter for a subpicture under a precondition to suppress a decrease in bit efficiency will be described with an example.

2. One Embodiment

In one embodiment of the present disclosure, it is a precondition that partial regions of a plurality of subpictures into which one picture is segmented have an equal width and an equal height, in other words, subpictures are defined by equally segmenting one picture. In a case where this precondition is satisfied, for second or subsequent subpictures (i is an integer of 1 or greater), subpic_width_minus1[0] and subpic_height_minus1[0] of the previous subpicture are diverted, that is, subpicture mapping information in a sequence parameter set (SPS) defines that a width and a height defined for a first subpicture (i is 0) located on an upper left side of the picture are diverted. As a result, in a case where the subpictures have an equal width and an equal height, parameters (i.e., subpic_width_minus1[i] and subpic_height_minus1[i]) defining widths and heights of the second and subsequent subpictures in the sequence parameter set (SPS) can be omitted, thereby reducing the number of bits of the parameters in the subpicture mapping information and suppressing a decrease in bit efficiency accordingly.

2.1 Syntax of Subpicture Mapping Information

FIG. 6 is a diagram illustrating an example of a sequence parameter set (SPS) in which subpicture mapping information is signaled according to the present embodiment. As illustrated in FIG. 6, the SPS according to the present embodiment additionally includes "fixed_subpic_width_height_flag" in the 5th row, "&&(!fixed_subpic_width_height_flag||(fixed_subpic_width_height_flag && i==0))" in an if-clause of the 11th row, and "&& (!fixed_subpic_width_height_flag||(fixed_subpic_width_height_flag && i==0))" in an if-clause of the 13th row, as compared with the SPS described with reference to FIG. 2.

"fixed_subpic_width_height_flag" is a flag indicating whether or not all the subpictures have an equal width and an equal height. For example, when "fixed_subpic_width_height_flag" is '1', this indicates that all the subpictures have an equal width and an equal height, and when "fixed_subpic_width_height_flag" is '0', this indicates that at least one of the subpictures has a width and a height different from those of the other subpictures.

"&&(! fixed_subpic_width_height_flag||(fixed_subpic_width_height_flag && i==0))" added in the if-clause of the 11th row and the 12th row define that when "fixed_subpic_width_height_flag" is '1', a value of "subpic_width_minus1[i]" where i is greater than 0 is considered as being equal to a value of "subpic_width_minus1[0]".

Similarly, "&&(!fixed_subpic_width_height_flag||(fixed_subpic_width_height_flag && i==0)))" added in the if-clause of the 13th row and the 14th row define that when "fixed_subpic_width_height_flag" is '1', a value of "subpic_height_minus1[i]" where i is greater than 0 is considered as being equal to that of "subpic_height_minus1[0]".

By adopting the above-described syntax, in a case where the subpictures have an equal width and an equal height, it is possible to omit subpic_width_minus1[i] and subpic_height_minus1[i], which define widths and heights of the second and subsequent subpictures, thereby reducing the number of bits of the parameters in the subpicture mapping information. As a result, it is possible to suppress a decrease in bit efficiency.

Note that the case where all the subpictures have an equal width and an equal height is assumed to be, for example, a case where six-side images of a full spherical video (3 degree of freedom (DoF) content) are allocated to respective subpictures. However, the present disclosure is not limited thereto, and the above-described method can be applied to various forms in which the subpictures have an equal width and an equal height.

2.2 Improvement in Bit Efficiency According to Omission of Parameter Indicating Reference Position of Each Subpicture (Modification)

Furthermore, in a case where all subpictures have an equal width and an equal height, a reference position (e.g., X and Y coordinates of a reference pixel located at an upper left end of each subpicture) of each subpicture can be easily obtained by calculation from a size (a width and a height) of each subpicture. In this case, the syntax defining the X and Y coordinates (subpic_ctu_top_left_x[i] and subpic_ctu_top_left_y[i]) of the reference pixel of each subpicture as illustrated in the 7th to 10th rows of FIG. 6 may be replaced with syntax exemplified in FIG. 7.

In FIG. 7, "&& !fixed_subpic_width_height_flag)" added in an if-clause of the 7th row and the 8th row define that when "fixed_subpic_width_height_flag" is '1', a value of "subpic_ctu_top_left_x[i]" where i is greater than 0 is calculated based on a value of "pic_width_max_in_luma_samples", which indicates a width of a picture, and a value of "subpic_width_minus1[0]", which indicates a width of a subpicture.

Similarly, "&& !fixed_subpic_width_height_flag)" added in an if-clause of the 9th row and the 10th row define that when "fixed_subpic_width_height_flag" is '1', a value of "subpic_ctu_top_left_y[i]" where i is greater than 0 is calculated based on a value of "pic_height_max_in_luma_samples", which indicates a height of a picture, and a value of "subpic_height_minus1[0]", which indicates a height of a subpicture, after obtaining the number of subpictures in the horizontal direction from a value of "pic_width_max_in_luma_samples", which indicates a width of a picture, and a value of "subpic_width_minus1[0]", which indicates a width of a subpicture.

By adopting the above-described syntax, in a case where the subpictures have an equal width and an equal height, it is possible to omit subpic_ctu_top_left_x[i] and subpic_ctu_top_left_y[i], which define reference positions of the second and subsequent subpictures as well as the first subpicture, for which definition of reference positions is omitted in the original syntax, thereby reducing the number of bits of the parameters in the subpicture mapping information. As a result, it is possible to suppress a decrease in bit efficiency.

2.3 Configuration Example of Image Encoding Device

Figure 8:
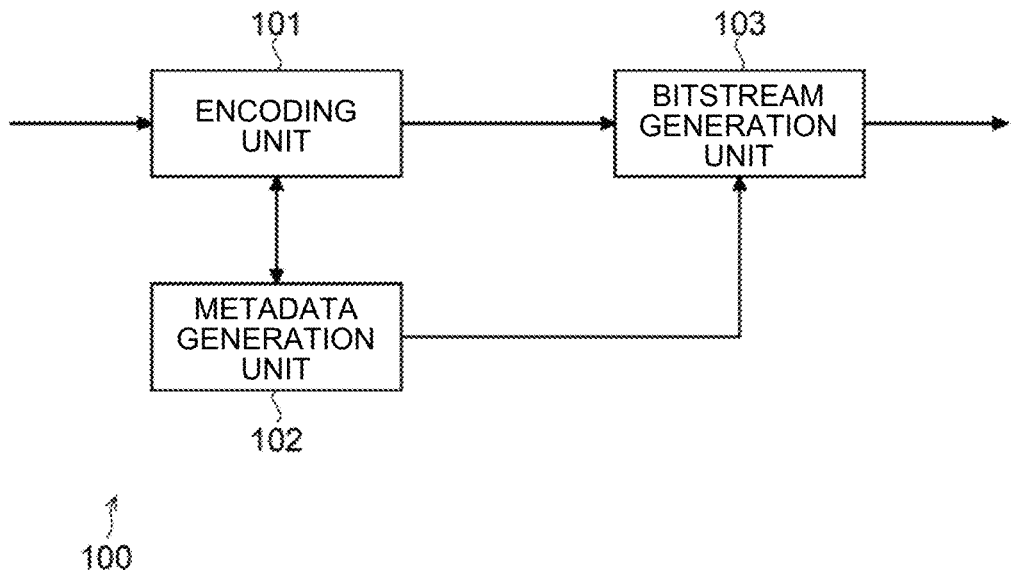
FIG. 8 is a block diagram illustrating an example of a configuration of an image encoding device, which is an aspect of an information processing device to which the technology according to one embodiment of the present disclosure is applied.

The above-described method for suppressing a decrease in bit efficiency can be applied to any device. For example, the above-described method for suppressing a decrease in bit efficiency can be applied to an encoding device. FIG. 8 is a block diagram illustrating an example of a configuration of an image encoding device, which is an aspect of an information processing device to which the technology according to the present embodiment is applied. An image encoding device 100 illustrated in FIG. 8 is a device that encodes an image, which is an example of an encoding device. The image encoding device 100 performs encoding, for example, by applying an encoding technique based on the VVC described in Non Patent Literature 1. At that time, the image encoding device 100 performs encoding by applying the method described with reference to FIGS. 6 to 9 and the like.

Note that FIG. 8 merely illustrates main processing units, main data flow, and the like, and those illustrated in FIG. 8 do not include all of the configuration of the image encoding device. That is, the image encoding device 100 may include another processing unit that is not illustrated as a block in FIG. 8, or there may be another processing or data flow that is not illustrated by an arrow or the like in FIG. 8 in the image encoding device 100.

As illustrated in FIG. 8, the image encoding device 100 includes an encoding unit 101, a metadata generation unit 102, and a bitstream generation unit 103.

the encoding unit 101 performs processing related to image encoding. For example, the encoding unit 101 acquires each picture of a moving image input to the image encoding device 100. the encoding unit 101 encodes the acquired picture by applying an encoding technique, for example, based on the VVC described in Non Patent Literature 1.

The encoding unit 101 supplies encoded data generated by encoding the image to the bitstream generation unit 103. Furthermore, the encoding unit 101 can appropriate transmit and receive certain information to and from the metadata generation unit 102 at the time of encoding.

The metadata generation unit 102 performs processing related to generation of metadata. For example, the metadata generation unit 102 transmits and receives certain information to and from the encoding unit 101 to generate metadata. For example, the metadata generation unit 102 can generate metadata including information on whether all subpictures have the same resolution, a position of a reference pixel of a subpicture, a resolution of a subpicture, and other various types of information as subpicture mapping information. The other various types of information may include, for example, information indicating whether all subpictures can be independently processed, subpicture 1D mapping information, and the like. The metadata generation unit 102 supplies the generated metadata to the bitstream generation unit 103.

The bitstream generation unit 103 performs processing related to generation of a bitstream. For example, the bitstream generation unit 103 acquires the encoded data supplied from the encoding unit 101. In addition, the bitstream generation unit 103 acquires the metadata supplied from the metadata generation unit 102. The bitstream generation unit 103 generates a bitstream including the acquired encoded data and metadata. The bitstream generation unit 103 outputs the bitstream to the outside of the image encoding device 100. The output bitstream is supplied to a decoding device, for example, via a storage medium or a communication medium. The decoding device performs decoding processing on the basis of information signaled in the bitstream.

2.3.1 Flow of Encoding Processing

Figure 9:
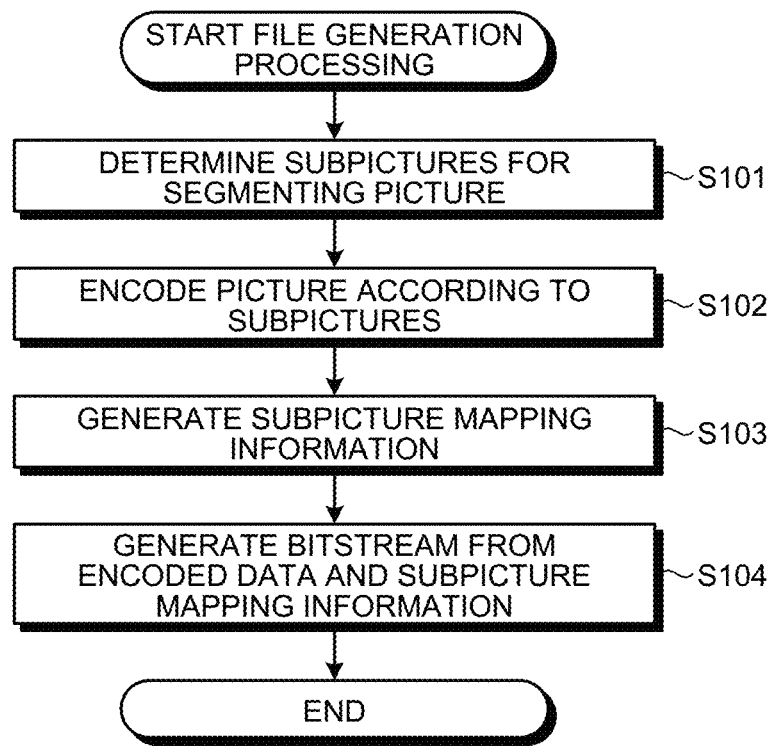
FIG. 9 is a flowchart illustrating an example of a flow of encoding processing executed by an image encoding device, which is an aspect of an information processing device to which the technology according to one embodiment of the present disclosure is applied.

Next, an example of a flow of encoding processing executed by the image encoding device 100 will be described with reference to a flowchart of FIG. 9.

When the encoding processing is started, the encoding unit 101 of the image encoding device 100 segments a picture into subpictures in step S101.

In step S102, the encoding unit 101 encodes the picture according to the subpictures segmented in step S101.

In step S103, the metadata generation unit 102 generates metadata including subpicture mapping information. At that time, the metadata generation unit 102 generates the subpicture mapping information with improved bit efficiency by using the above-described method.

In step S104, the bitstream generation unit 103 generates a bitstream by using the encoded data generated in step S102 and the metadata including subpicture mapping information generated in step S103. That is, the bitstream generation unit 103 generates a bitstream including those information items.

When the bitstream is generated, the encoding processing ends.

Meanwhile, the decoding device can perform decoding processing on the basis of information signaled in the bitstream.

2.4 Configuration Example of Image Decoding Device

Figure 10:
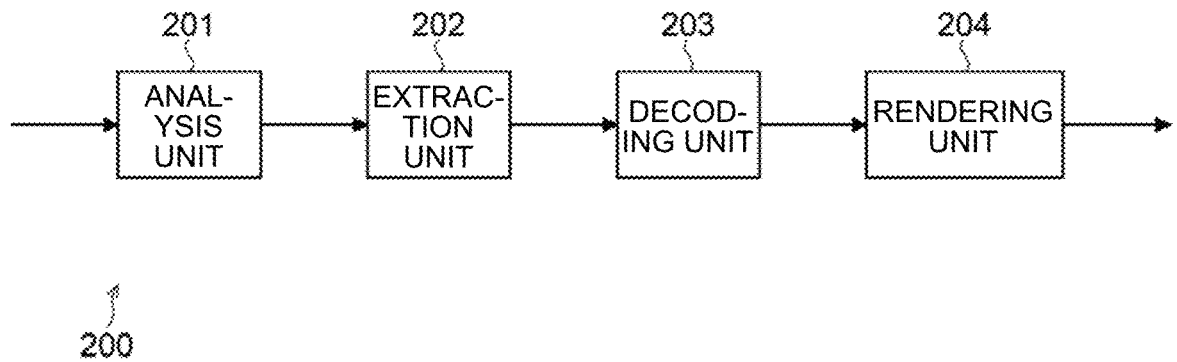
FIG. 10 is a block diagram illustrating an example of a configuration of an image decoding device, which is an aspect of an information processing device to which the technology according to one embodiment of the present disclosure is applied.

The technology according to the present embodiment can also be applied to a decoding device. FIG. 10 is a block diagram illustrating an example of a configuration of an image decoding device, which is an aspect of an information processing device to which the technology according to the present embodiment is applied. An image decoding device 200 illustrated in FIG. 10 is a device that decodes encoded data to generate an image, which is an example of a decoding device. The image decoding device 200 performs decoding, for example, by applying a decoding technique based on the VVC described in Non Patent Literature 1. At that time, the image decoding device 200 performs decoding by applying the method described with reference to FIGS. 6 to 9, etc.

Note that FIG. 10 merely illustrates main processing units, main data flow, and the like, and those illustrated in FIG. 10 do not include all of the configuration of the image decoding device. That is, the image decoding device 200 may include another processing unit that is not illustrated as a block in FIG. 10, or there may be another processing or data flow that is not illustrated by an arrow or the like in FIG. 10 in the image decoding device 200.

As illustrated in FIG. 10, the image decoding device 200 includes an analysis unit 201, an extraction unit 202, a decoding unit 203, and a rendering unit 204.

The analysis unit 201 performs processing related to analysis of metadata. For example, the analysis unit 201 acquires a bitstream input to the image decoding device 200. The analysis unit 201 analyzes metadata included in the bitstream. Then, the analysis unit 201 supplies a result of analyzing the metadata and the bitstream to the extraction unit 202.

The extraction unit 202 extracts desired information from the bitstream supplied from the analysis unit 201 on the basis of the analysis result supplied from the analysis unit 201. For example, the extraction unit 202 extracts encoded data of an image, metadata including subpicture mapping information, and the like from the bitstream. Then, the extraction unit 202 supplies the information and the like extracted from the bitstream to the decoding unit 203.

The decoding unit 203 performs processing related to decoding. For example, the decoding unit 203 acquires the information supplied from the extraction unit 202. The decoding unit 203 decodes the acquired encoded data on the basis of the acquired metadata to generate a picture. At that time, the decoding unit 203 segments the generated picture into subpictures by appropriately applying the method described with reference to FIGS. 6 to 9, etc. Then, the decoding unit 203 supplies the generated picture (an image of each subpicture) to the rendering unit 204. Furthermore, the decoding unit 203 may supply subpicture rendering information to the rendering unit 204.

The rendering unit 204 performs processing related to rendering. For example, the rendering unit 204 acquires the picture and the subpicture rendering information supplied from the decoding unit 203. The rendering unit 204 renders a desired subpicture in the picture on the basis of the subpicture rendering information to generate a display image. Then, the rendering unit 204 outputs the generated display image to the outside of the image decoding device 200. The display image is supplied to and displayed on an image display device, which is not illustrated, via a certain storage medium, communication medium, or the like.

As described above, the image decoding device 200 analyzes various types of information including subpicture mapping information signaled from the encoding device, and performs decoding processing on the basis of the information.

2.4.1 Flow of Decoding Processing

Figure 11:
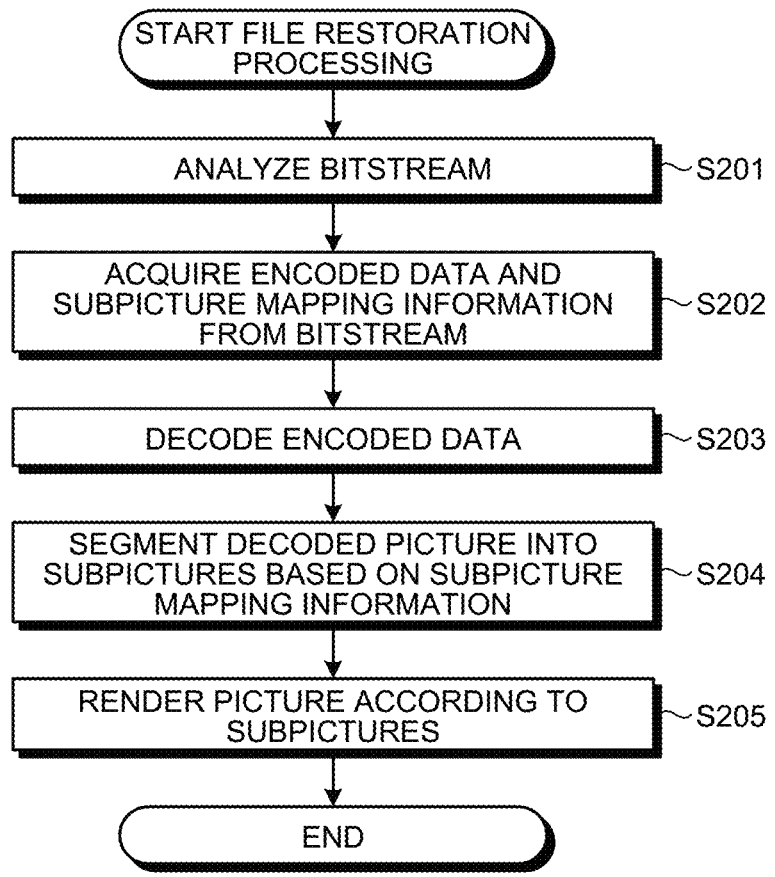
FIG. 11 is a flowchart illustrating an example of a flow of decoding processing executed by an image decoding device, which is an aspect of an information processing device to which the technology according to one embodiment of the present disclosure is applied.

Next, an example of a flow of decoding processing executed by the image decoding device 200 will be described with reference to a flowchart of FIG. 11.

When the decoding processing is started, the analysis unit 201 of the image decoding device 200 analyzes metadata included in a bitstream in step S201.

In step S202, the extraction unit 202 extracts encoded data and metadata including subpicture mapping information from the bitstream on the basis of a result of analysis in step S201.

In step S203, the decoding unit 203 decodes the encoded data extracted from the bitstream in step S202, on the basis of the metadata extracted from the bitstream in step S202, to generate a picture (each subpicture included in the picture).

In step S204, the decoding unit 203 segments the picture decoded in step S203 into a plurality of subpictures on the basis of the subpicture mapping information extracted in step S202.

In step S205, the rendering unit 204 renders the picture segmented into subpictures in step S204 to generate a display image.

When the display image is generated, the decoding processing ends.

By performing the decoding processing as described above, decoding and rendering are performed on the basis of the metadata including the signaled subpicture mapping information.

3. Appendix

Computer

The above-described series of processes can be executed by either hardware or software. In a case where the series of processes are executed by software, a program configuring the software is installed in a computer. Here, the computer includes a computer incorporated in dedicated hardware, a computer capable of executing various functions by installing various programs therein, e.g., a general-purpose personal computer, or the like.

Figure 12:
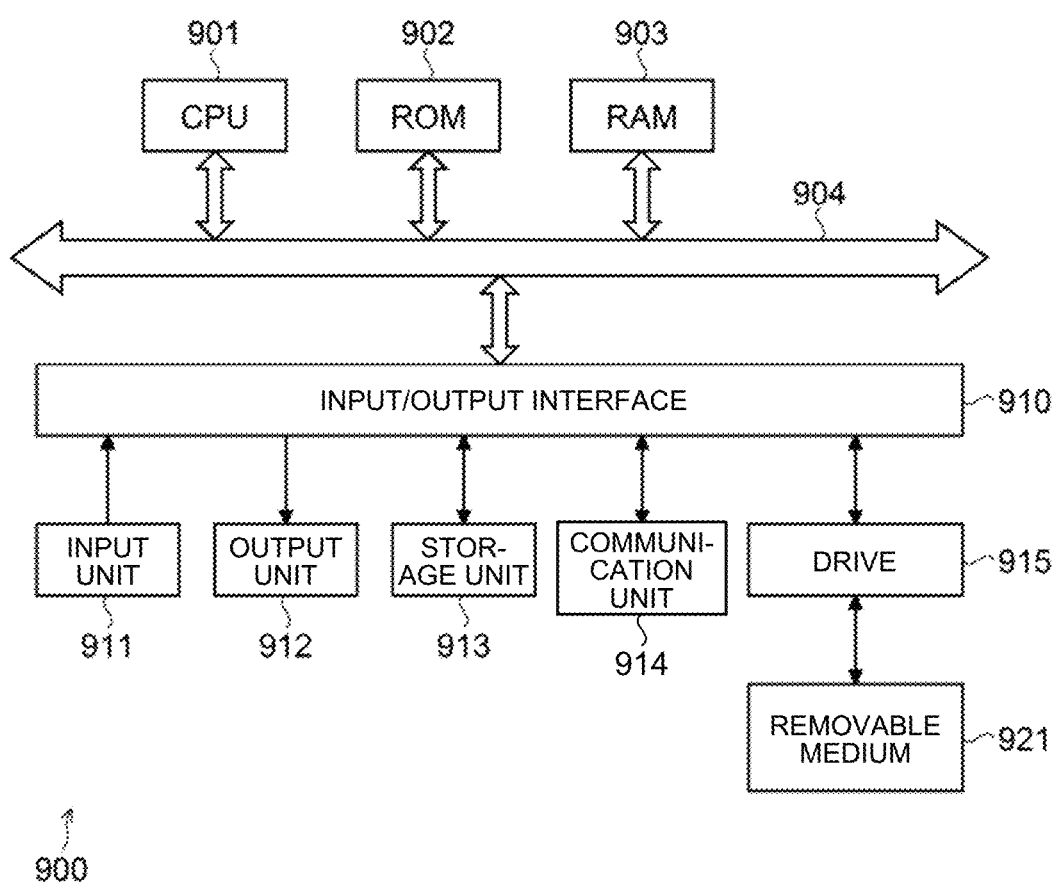
FIG. 12 is a block diagram illustrating a configuration example of hardware of a computer executing a program for the information processing device according to the embodiment of the present disclosure to execute a series of processes.

FIG. 12 is a block diagram illustrating a configuration example of hardware of a computer executing a program for the information processing device according to the above-described embodiment to execute a series of processes.

In a computer 900 illustrated in FIG. 12, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads a program stored in, for example, the storage unit 913 into the RAM 903 via the input/output interface 910 and the bus 904 and executes the program, so that the above-described series of processes are performed. The RAM 903 also appropriately stores data and the like necessary for the CPU 901 to execute various kinds of processing.

The program executed by the computer can be applied after being recorded, for example, in the removable medium 921 as a package medium or the like. In this case, the program can be installed in the storage unit 913 via the input/output interface 910 by attaching the removable medium 921 to the drive 915.

Alternatively, this program can also be provided via a wired or wireless transmission medium such as a local area network, the Internet, or digital satellite broadcasting. In this case, the program can be received by the communication unit 914 and installed in the storage unit 913.

Alternatively, this program can be installed in the ROM 902 or the storage unit 913 in advance.

Application of Present Technology

The present technology can be applied to any image encoding/decoding technique. That is, specifications of various types of processing related to image encoding/decoding such as transformation (inverse transformation), quantization (inverse quantization), encoding (decoding), and prediction are arbitrary unless contradictory to the present technology described above, and are not limited to the above-described examples. In addition, unless contradictory to the present technology described above, some of these processes may be omitted.

Furthermore, the present technology can be applied to a multi-view image encoding/decoding system that encodes/decodes a multi-view image including images from a plurality of viewpoints (views). In that case, the present technology may be applied to encoding and decoding from each viewpoint (view).

Furthermore, the present technology can be applied to a tiered image encoding (scalable encoding)/decoding system that encodes/decodes a tiered image multi-layered (multi-tiered) to have a scalability function for a predetermined parameter. In that case, the present technology may be applied to encoding and decoding of each tier (layer).

Furthermore, although the image encoding device 100, the image decoding device 200, and an image processing system 500 (a file generation device 501 and a client device 503) have been described above as application examples of the present technology, the present technology can be applied to any configuration.

For example, the present technology can be applied to various electronic devices such as a transmitter and a receiver (e.g., a television receiver and a mobile phone) in satellite broadcasting, cable broadcasting such as cable TV, distribution over the Internet, and distribution to a terminal by cellular communication, or a device (e.g., a hard disk recorder and a camera) that records images on media such as an optical disk, a magnetic disk, and a flash memory, or reproduces images from these storage media.

Furthermore, for example, the present technology can also be implemented as a partial configuration of a device, such as a processor (e.g., a video processor) as a system large scale integration (LSI) or the like, a module (e.g., a video module) using a plurality of processors or the like, a unit (e.g., a video unit) using a plurality of modules or the like, or a set (e.g., a video set) obtained by further adding other functions to the unit.

Furthermore, for example, the present technology can also be applied to a network system including a plurality of devices. For example, the present technology may be implemented as cloud computing that is shared and processed jointly by a plurality of devices through a network. For example, the present technology may be implemented in a cloud service that provides a service related to an image (moving image) to a certain terminal such as a computer, an audio visual (AV) device, a portable information processing terminal, or an Internet of things (IoT) device.

Note that, in the present specification, a system refers to a set of a plurality of components (devices, modules (parts), or the like), no matter whether all the components are in the same housing. Therefore, both a plurality of devices housed in separate housings and connected to each other through a network and one device including a plurality of modules housed in one housing are referred to as systems.

Field to which Present Technology is Applicable and Use of Present Technology

The system, the device, the processing unit, and the like to which the present technology is applied can be used in any fields such as traffic, medical care, crime prevention, farming industry, livestock industry, mining industry, beauty, factory, home appliance, weather, and nature observation. In addition, the present technology can be used for any purpose.

For example, the present technology can be applied to a system or a device provided for provision of content for appreciation or the like. Furthermore, for example, the present technology can also be applied to a system or a device provided for traffic, such as traffic condition supervision or automatic driving control. Furthermore, for example, the present technology can also be applied to a system or a device provided for security. Furthermore, for example, the present technology can be applied to a system or a device provided for automatically controlling a machine or the like. Furthermore, for example, the present technology can also be applied to a system or a device provided for farming industry and livestock industry. Furthermore, for example, the present technology can also be applied to a system or a device that monitors a condition of nature such as volcano, forest, or ocean, wildlife, or the like. Furthermore, for example, the present technology can also be applied to a system or a device provided for sports.

Others

Note that, in the present specification, the "flag" is information for identifying a plurality of states, and includes not only information used for identifying two states of true (1) and false (0) but also information capable of identifying three or more states. Therefore, the "flag" may take, for example, a binary value of I/O or a ternary or more value. That is, the "flag" may include any number of bits, for example, one bit or a plurality of bits. In addition, the identification information (including the flag) is assumed to include not only identification information in a bitstream but also information regarding a difference of the identification information from certain reference information in the bitstream. Thus, in the present specification, the "flag" and the "identification information" include not only information regarding the flag and the identification information but also information regarding a difference thereof from the reference information.

Furthermore, various types of information (metadata and the like) regarding encoded data (bitstream) may be transmitted or recorded in any form as long as the information is associated with the encoded data. Here, the term "associate" means, for example, that one piece of data can be used (linked) when another piece of data is processed. That is, data associated with each other may be integrated as one piece of data or provided as separate pieces of data. For example, information associated with encoded data (image) may be transmitted on a transmission path different from that of the encoded data (image). Furthermore, for example, information associated with encoded data (image) may be recorded in a recording medium different from that of the encoded data (image) (or in a different recording area of the same recording medium). Note that data may be partly "associated" with each other, rather than entirely. For example, an image and information corresponding to the image may be associated with each other in any unit, such as a plurality of frames, a single frame, or part of a frame.

Note that, in the present specification, terms such as "synthesize", "multiplex", "add", "integrate", "include", "store", "put in", "place into", and "insert" each refer to grouping a plurality of items into one such as grouping encoded data and metadata into one data, meaning one way of the above-described "association".

Furthermore, the embodiments of the present technology are not limited to the above-described embodiments, and various modifications can be made without departing from the gist of the present technology.

For example, the configuration described as a single device (or a single processing unit) may be divided to be configured as a plurality of devices (or a plurality of processing units). Conversely, the configurations described as a plurality of devices (or a plurality of processing units) above may be integrated to be configured as a single device (or a single processing unit). Furthermore, needless to say, a configuration other than the above-described configurations may be added to the configuration of each device (or each processing unit). Moreover, a part of the configuration of a certain device (or a certain processing unit) may be included in the configuration of another device (or another processing unit), as long as the overall configuration and operation of the system remain substantially unchanged.

Furthermore, for example, the above-described program may be executed in any device. In that case, the device only needs to have a necessary function (a functional block or the like) and be capable of obtaining necessary information.

Furthermore, for example, each step of one flowchart may be executed by a single device, or may be shared and executed by a plurality of devices. Moreover, in a case where a plurality of kinds of processing are included in a single step, the plurality of kinds of processing may be executed by a single device, or may be shared and executed by a plurality of devices. In other words, a plurality of kinds of processing included in a single step can also be executed as processing in a plurality of steps. Conversely, the processing described as a plurality of steps can be collectively executed as a single step.

Furthermore, for example, concerning the program executed by the computer, processing of steps describing the program may be executed in time series in the order described in the present specification, or may be executed in parallel or individually at necessary timing such as when the program is called. That is, the processing of the steps may be executed in an order different from the above-described order, as long as causing no contradiction. Moreover, processing of steps describing a program may be executed in parallel with processing of another program, or may be executed in combination with processing of another program.

Furthermore, for example, each of a plurality of technologies related to the present technology can be implemented independently alone, as long as causing no contradiction. Needless to say, the plurality of present technologies can be implemented in any combination. For example, some or all of the present technology described in one embodiment can be implemented in combination with some or all of the present technology described in another embodiment. Furthermore, some or all of any of the present technologies described above can be implemented in combination with another technology that is not described above.

Furthermore, for example, each of a plurality of technologies related to the present technology can be implemented independently alone, as long as causing no contradiction. Needless to say, the plurality of present technologies can be implemented in any combination. For example, some or all of the present technology described in one embodiment can be implemented in combination with some or all of the present technology described in another embodiment. Furthermore, some or all of any of the present technologies described above can be implemented in combination with another technology that is not described above.

Note that the present technology can also take the following configurations.

(1)

An information processing device comprising:

an encoding unit that encodes a picture including two or more subpictures to generate encoded data;

a metadata generation unit that generates subpicture mapping information including first size information of a first subpicture among the two or more subpictures and information that second size information of each of one or more second subpictures other than the first subpicture being considered the same as the first size information of the first subpicture; and a bitstream generation unit that generates a bitstream including the encoded data and the subpicture mapping information.

(2)

The information processing device according to (1), wherein the first size information is defined in coding tree unit (CTU).

(3)

The information processing device according to (1) or (2), wherein the first subpicture is a subpicture located at an upper left end of the picture.

(4)

The information processing device according to any one of (1) to (3), wherein the first size information includes information on a width and a height of the first subpicture.

(5)

The information processing device according to any one of (1) to (4), wherein the subpicture mapping information further includes position information indicating a position of each of the first subpicture and the one or more second subpictures in the picture.

(6)

The information processing device according to any one of (1) to (4), wherein the subpicture mapping information further includes first position information indicating a position of the first subpicture in the picture and second position information indicating a position of each of the one or more second subpictures in the picture, the second position information being calculated on the basis of the first position information and the first size information.

(7)

An information processing device comprising:

an extraction unit that acquires encoded data and subpicture mapping information from a bitstream;

a decoding unit that decodes the encoded data to restore a picture, and segments the restored picture into two or more subpictures on the basis of the subpicture mapping information; and a rendering unit that renders the picture according to the two or more subpictures, wherein the subpicture mapping information including first size information of a first subpicture among the two or more subpictures and information that second size information of each of one or more second subpictures other than the first subpicture being considered the same as the first size information of the first subpicture.

(8)

The information processing device according to (7), wherein the first size information is defined in coding tree unit (CTU).

(9)

The information processing device according to (7) or (8), wherein the first subpicture is a subpicture located at an upper left end of the picture.

(10)

The information processing device according to any one of (7) to (9), wherein the first size information includes information on a width and a height of the first subpicture.

(11)

The information processing device according to any one of (7) to (10), wherein the subpicture mapping information further includes position information indicating a position of each of the first subpicture and the one or more second subpictures in the picture.

(12)

The information processing device according to any one of (7) to (10), wherein the subpicture mapping information further includes first position information indicating a position of the first subpicture in the picture and second position information indicating a position of each of the one or more second subpictures in the picture, the second position information being calculated on the basis of the first position information and the first size information, and the decoding unit calculates the second position information indicating a position of each of the one or more second subpictures in the picture on the basis of the first position information and the first size information.

(13)

An information processing method comprising:

encoding a picture including two or more subpictures to generate encoded data;

generating subpicture mapping information including first size information of a first subpicture among the two or more subpictures and information that second size information of each of one or more second subpictures other than the first subpicture being considered the same as the first size information of the first subpicture; and generating a bitstream including the encoded data and the subpicture mapping information.

(14)

An information processing method comprising:
acquiring encoded data and subpicture mapping information from a bitstream;
decoding the encoded data to restore a picture, and segmenting the restored picture into two or more subpictures on the basis of the subpicture mapping information; and
rendering the picture according to the two or more subpictures,
wherein the subpicture mapping information including first size information of a first subpicture among the two or more subpictures and information that second size information of each of one or more second subpictures other than the first subpicture being considered the same as the first size information of the first subpicture.

REFERENCE SIGNS LIST

100 IMAGE ENCODING DEVICE
101 ENCODING UNIT
102 METADATA GENERATION UNIT
103 BITSTREAM GENERATION UNIT
200 IMAGE DECODING DEVICE
201 ANALYSIS UNIT
202 EXTRACTION UNIT
203 DECODING UNIT
204 RENDERING UNIT

The invention claimed is:

1. An information processing device comprising:
a control circuitry that:
encodes a picture including two or more subpictures to generate encoded data;
generates subpicture mapping information that includes:
first size information indicating a size of a first subpicture among the two or more subpictures,
reference position information indicating X and Y coordinates of a reference pixel in the first subpicture, and
a size flag indicating whether or not a size of each of one or more second subpictures is the same as the size of the first subpicture; and
generates a bitstream including the encoded data and the subpicture mapping information,
wherein:
based on the size flag indicating that the size of each of the one or more second subpictures is not the same as the size of the first subpicture, the subpicture mapping information further includes:
information identifying the size of each of the one or more second subpictures, and
reference position information indicating X and Y coordinates of a reference pixel in each of the one or more second subpictures, and
based on the size flag indicating that the size of each of the one or more second subpictures is the same as the size of the first subpicture, the subpicture mapping information:
omits additional information identifying the size of each of the one or more second subpictures, and
omits the reference position information indicating X and Y coordinates of the reference pixel in each of the one or more second subpictures.

2. The information processing device according to claim 1, wherein
the size of the first subpicture is defined in coding tree unit (CTU).

3. The information processing device according to claim 1, wherein
the first subpicture is a subpicture located at an upper left end of the picture.

4. The information processing device according to claim 1, wherein
the first size information includes information on a width and a height of the first subpicture.

5. The information processing device according to claim 1, wherein
the subpicture mapping information further includes position information indicating a position of each of the first subpicture and the one or more second subpictures in the picture.

6. The information processing device according to claim 1, wherein
the subpicture mapping information further includes:
first position information indicating a position of the first subpicture in the picture, and
a position flag indicating whether or not a position of each of the one or more second subpictures in the picture is to be determined on the basis of the first position information and the first size information.

7. An information processing device comprising:
a control circuitry that:
acquires encoded data and subpicture mapping information from a bitstream;
decodes the encoded data to restore a picture, and segments the restored picture into two or more subpictures on the basis of the subpicture mapping information; and
renders the picture according to the two or more subpictures,
wherein the subpicture mapping information includes:
first size information identifying a size of a first subpicture among the two or more subpictures,
reference position information indicating X and Y coordinates of a reference pixel in the first subpicture, and
a size flag indicating whether or not a size of each of one or more second subpictures is the same as the size of the first subpicture,
wherein:
based on the size flag indicating that the size of each of the one or more second subpictures is not the same as the size of the first subpicture, the subpicture mapping information further includes:
information identifying the size of each of the one or more second subpictures, and
reference position information indicating X and Y coordinates of a reference pixel in each of the one or more second subpictures, and
based on the size flag indicating that the size of each of the one or more second subpictures is the same as the size of the first subpicture, the subpicture mapping information:
omits additional information identifying the size of each of the one or more second subpictures, and
omits the reference position information indicating X and Y coordinates of the reference pixel in each of the one or more second subpictures.

8. The information processing device according to claim 7, wherein
the size of the first subpicture is defined in coding tree unit (CTU).

9. The information processing device according to claim 7, wherein the first subpicture is a subpicture located at an upper left end of the picture.

10. The information processing device according to claim 7, wherein
the first size information includes information on a width and a height of the first subpicture.

11. The information processing device according to claim 7, wherein
the subpicture mapping information further includes position information indicating a position of each of the first subpicture and the one or more second subpictures in the picture.

12. The information processing device according to claim 7, wherein
the subpicture mapping information further includes:
first position information indicating a position of the first subpicture in the picture, and
a position flag indicating whether or not a position of each of the one or more second subpictures in the picture is to be determined on the basis of the first position information and the first size information, and
the control circuitry calculates the second position information indicating a position of each of the one or more second subpictures in the picture on the basis of the first position information and the first size information.

13. An information processing method performed by an information processing device, the method comprising:
encoding a picture including two or more subpictures to generate encoded data;
generating subpicture mapping information that includes:
first size information indicating a size of a first subpicture among the two or more subpictures,
reference position information indicating X and Y coordinates of a reference pixel in the first subpicture, and
a size flag indicating whether or not a size of each of one or more second subpictures is the same as the size of the first subpicture; and
generating a bitstream including the encoded data and the subpicture mapping information,
wherein:
based on the size flag indicating that the size of each of the one or more second subpictures is not the same as the size of the first subpicture, the subpicture mapping information further includes:
information identifying the size of each of the one or more second subpictures, and
reference position information indicating X and Y coordinates of a reference pixel in each of the one or more second subpictures, and
based on the size flag indicating that the size of each of the one or more second subpictures is the same as the size of the first subpicture, the subpicture mapping information:
omits additional information identifying the size of each of the one or more second subpictures, and
omits the reference position information indicating X and Y coordinates of the reference pixel in each of the one or more second subpictures.

14. An information processing method performed by an information processing device, the method comprising:
acquiring encoded data and subpicture mapping information from a bitstream;
decoding the encoded data to restore a picture, and segmenting the restored picture into two or more subpictures on the basis of the subpicture mapping information; and
rendering the picture according to the two or more subpictures,
wherein the subpicture mapping information includes:
first size information identifying a size of a first subpicture among the two or more subpictures,
reference position information indicating X and Y coordinates of a reference pixel in the first subpicture, and
a flag indicating whether or not a size of each of one or more second subpictures is the same as the size of the first subpicture,
wherein:
based on the size flag indicating that the size of each of the one or more second subpictures is not the same as the size of the first subpicture, the subpicture mapping information further includes:
information identifying the size of each of the one or more second subpictures, and
reference position information indicating X and Y coordinates of a reference pixel in each of the one or more second subpictures, and
based on the size flag indicating that the size of each of the one or more second subpictures is the same as the size of the first subpicture, the subpicture mapping information:
omits additional information identifying the size of each of the one or more second subpictures, and
omits the reference position information indicating X and Y coordinates of the reference pixel in each of the one or more second subpictures.

* * * * *